(12) United States Patent
Burns et al.

(10) Patent No.: US 8,523,557 B2
(45) Date of Patent: Sep. 3, 2013

(54) BLOW NEEDLE FOR EXTRUSION BLOW MOLDING PET

(75) Inventors: Jason E. Burns, York, PA (US); Larry M. Taylor, Landisville, PA (US); Wayne Perring, York, PA (US)

(73) Assignee: Graham Packaging Company, L.P., York, PA (US)

( * ) Notice: Subject to any disclaimer, the term of this patent is extended or adjusted under 35 U.S.C. 154(b) by 322 days.

(21) Appl. No.: 12/893,665

(22) Filed: Sep. 29, 2010

(65) Prior Publication Data

US 2012/0074619 A1    Mar. 29, 2012

(51) Int. Cl.
*B29C 49/60*    (2006.01)

(52) U.S. Cl.
USPC .......................................................... 425/536

(58) Field of Classification Search
USPC .......................................................... 425/536
See application file for complete search history.

(56) References Cited

U.S. PATENT DOCUMENTS

| | | | |
|---|---|---|---|
| 3,571,848 A * | 3/1971 | Szajna | 425/536 |
| 3,869,237 A * | 3/1975 | Hellmer et al. | 425/536 |
| 3,932,084 A | 1/1976 | Reilly | |
| 4,046,498 A | 9/1977 | Appel et al. | |
| 4,080,146 A * | 3/1978 | Hellmer | 425/536 |
| 4,161,579 A | 7/1979 | Edelman et al. | |
| 4,859,397 A | 8/1989 | Peters | |
| 4,867,197 A | 9/1989 | Ritter et al. | |
| 4,943,228 A | 7/1990 | Reymann et al. | |
| 4,946,366 A | 8/1990 | Dundas et al. | |
| 5,078,948 A | 1/1992 | Troutman et al. | |
| 5,565,165 A * | 10/1996 | Matsuhashi | 425/536 |
| 5,939,108 A | 8/1999 | Nobuyuki et al. | |
| 7,766,645 B2 | 8/2010 | Legallais | |
| 2006/0290033 A1 | 12/2006 | Purdel | |
| 2009/0085243 A1 | 4/2009 | Taylor et al. | |

FOREIGN PATENT DOCUMENTS

| | | |
|---|---|---|
| CN | 200977723 | 11/2007 |
| DE | 102005029916 | 3/2007 |
| JP | 2004-223816 | 8/2004 |
| WO | WO92/03276 | 3/1992 |
| WO | 02/072334 | 9/2002 |
| WO | WO2009/059091 | 5/2009 |

OTHER PUBLICATIONS

International Search Report and Written Opinion mailed Nov. 28, 2011 for corresponding international patent application No. PCT/US2011/049901.

* cited by examiner

*Primary Examiner* — Robert B Davis
(74) *Attorney, Agent, or Firm* — Stradley Ronon Stevens & Young, LLP (57) ABSTRACT

The present invention relates to a hollow blow needle for introducing a pressurized fluid into an extruded parison enclosed by two mold halves, the needle comprising: a body portion having an inner first diameter; a neck portion having an inner second diameter, wherein the inner second diameter is less than the inner first diameter; and a tip portion comprising a first angled portion, a second angled portion that is a different angle relative to the first angled portion, and an orifice.

19 Claims, 5 Drawing Sheets

BLOW NEEDLE FOR EXTRUSION BLOW MOLDING PET

BACKGROUND OF THE INVENTION

The present invention is directed to a process for extrusion blow molding extrusion grade polyethylene terephthalate on a high-output blow molding machine such as, for example, a rotary wheel blow molding machine. More particularly, the present invention is directed to a hollow blow needle that is particularly designed for use in connection with extrusion blow molding extrusion grade polyethylene terephthalate.

Polymer resins, such as polyethylene terephthalate (PET), are widely used in the packaging industry. PET is a linear, thermoplastic polyester resin. The myriad of advantages of PET include toughness, clarity, good barrier properties, lightweight, design flexibility, chemical resistance and good shelf-life performance. Furthermore, PET is environmentally friendly since it can often be recycled. These characteristics of PET make it a popular material in the manufacturing of containers, for example, beverage bottles.

There are a variety of production methodologies to produce PET containers. For example, injection stretch blow molding is commonly used to make PET bottles. Of the various methodologies, one-piece PET containers having an integrated handle are commonly formed using extrusion blow molding (EBM). The EBM process includes extruding a polymer resin in a softened state through an annular die to form a molten hollow tube (also referred to herein as a "parison"). The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

Polyesters (which includes PET) are typically classified by inherent viscosity (I.V.) as a measure of molecular weight. To form beverage bottles, "bottle grade" PET having an I.V. of about 0.72-0.84 dl/g, is typically used. Bottle grade PET has linear polymer chains and by design has a melt viscosity that is low enough to enable a faster injection stretch blow molding step with the least resistance to flow. Bottle grade PETs generally cannot be used in the production of larger handleware containers using EBM because of low melt strength. Melt strength is quantified by measuring melt viscosity at very low shear rates (approaching zero shear rate). Low melt strength hinders the ability to form a suitable parison. For example, in a vertical rotary extrusion blow molding machine, the parison extrudes upwards. The lack of melt strength and subsequent lack of parison rigidity will not allow the parison to form upwards. In this case the material will spill out over the sides of the head when extruded.

To make PET suitable for EBM, PET manufacturers have developed special grades of PET also referred to as extrusion grade PET or "EPET". Typically, EPET is high molecular weight PET having an I.V. of 1.0 dl/g or greater as measured by solution viscosity. For PET resins I.V. is used as a measure of molecular weight. The average molecular weight of a resin reflects the average length of polymer chains present therein. In general, melt strength increases with chain length and, thereby, also increases with molecular weight. However, higher I.V. polymers generally require higher processing temperatures which lead to certain processing challenges. One major processing challenge is to increase the production output of an EBM process because the process window for a high I.V. PET in an EBM process is narrow, making it difficult to run a stable extrusion blow molding operation at a high production output.

For example, current EBM processes for EPET containers is to employ a shuttle-type blow extrusion blow molding machine. The steps required for a shuttle machine to blow mold a hollow plastic object can be described by the following sequence of operations. First, as the dropping parisons approach the length of the object to be blown, the mold, in an open position, "shuttles" sideways to a point directly under the flow head of the machine. The molds then close to capture the parison. A knife cuts the parisons directly above the molds. The knife may be either a cold knife (cutting with a sharp edge) or a hot knife (burning through the parison).

The molds shuttle away from the flow head until they are directly under the blow pin stations. If the mold movement is horizontal, the extruder head is made to bob up vertically, so that the continuously extruding parisons do not drag against the mold as it moves sideways. In some shuttle machinery, the molds shuttle down at an angle, eliminating the need for the head and extruders to bob upwards. The blow pins are forced down into the still-open necks of the containers, calibrating the necks of the containers. In most cases, the blow pins punch down onto striker plates, which form the top edge of the neck to a precise flat dimension. Air pressure is applied to blow the containers. In many cases, the blow air is turned on before the blow pins enter the open neck of the parison, to force the plastic outward and ensure a good neck formation.

After the containers have cooled, the molds open, and again shuttle under the flow head of the machine. As the molds close on the molten parisons, masking stations that are attached to the sides of the mold close over the outside of the previously blown containers, which are still held in place by the blow pins. The blow pins retract, leaving the containers held only by the masks. As the molds again shuttle sideways, the masks transfer the formed containers sideways to a punching station. Punches come forward to remove the tails, top moil, and any handle (grip) slugs away from the bottles. The bottles are then conveyed out of the machine. This may be done by transferring the bottles onto conveyor belts, by take-out devices, or by simply dropping the bottles into a chute or onto a takeaway conveyor.

A major limitation of a shuttle machine is that it is not cost effective for extremely high volumes such as that experienced in a rotary wheel extrusion blow molding machine such as, for example, a vertical rotary blow-molding machine. A shuttle machine typically has an output of between 20 and 40 bottles per minute (BPM). A vertical rotary blow-molding machine, in contrast, can have an output of, for example, over 100 bottles per minute depending on the number of cavities and molds.

Vertical rotary blow-molding machines index circumferentially spaced mold halves in steps around a vertical axis. In such machines, the flow head typically does not move and extrudes a continuous parison that is continually captured by each mold. The mold opens up just big enough to allow for head to pass through, then captures the parison. The parison is severed by knives attached to the mold as the mold closes. The parison is severed adjacent the top of the mold halves, the mold halves are moved away from the extrusion station, and a "blow needle" is interjected into the side of the mold (near the top) and pierces the parison. The blown parison cools as the mold halves are rotated around the machine, following which the mold halves open at an ejection station and the finished article, commonly a container, is ejected from between the mold halves. In operation, the rotary wheel can produce at least 110 bottles per minute for a 22 cavity mold machine (22 molds) rotating at a rate of 5 RPM.

EPET, however, needs to be processed at higher parison temperatures relative to regular PET (from about 550-600°

F.). This necessitates that the molds be kept at higher temperatures (70-80° F.) during the blow molding process to, in part, achieve good container clarity. The challenge in adapting the EPET material to the faster rotary wheel is to control the rheological properties of the molten EPET at each point along the blowing process.

One particular problem addressed by the present invention involves the blow needle and subsequent injection of a fluid such as, for example, air. Because of the high processing temperature of the EPET and the high mold temperature, the semi-molten EPET has poor flow properties. When a conventional blow needle pierces the wall of, for example, a blow dome, and injects pressurized air into the closed mold, the pressurized air can cause the walls of the blow dome to thin to the point where they form a hole through which pressurized air can escape through the mold before the object is completely formed against the mold cavity thus severely deforming the container.

Accordingly, there is a need in the art for a blow needle that can be employed in a system for extrusion blow molding EPET containers on a high-output vertical rotary wheel blow molding machine that will allow for an increased rate of production without the aforementioned drawbacks.

BRIEF SUMMARY OF THE INVENTION

The present invention satisfies this need by providing a hollow blow needle for introducing a pressurized fluid into an extruded parison enclosed by two mold halves, the needle comprising: a body portion having an inner first diameter; a neck portion having an inner second diameter, wherein the inner second diameter is less than the inner first diameter; and a tip portion comprising a first angled portion, a second angled portion that is a different angle relative to the first angled portion, and an orifice.

In another aspect, the present invention is directed to a method of blow molding an article from a parison comprising EPET, the method comprising the steps of: positioning an extruded EPET parison in a cavity defined by two mold halves, wherein the parison is defined by at least one wall, and wherein the cavity comprises walls that define the shape of a container comprising a handle portion and a blow dome portion; introducing a hollow blow needle into the mold to contact a portion of the wall of the parison in the blow dome portion of the cavity to stretch the portion of the wall into the cavity, the hollow blow needle comprising: a body portion having an inner first diameter; a neck portion having an inner second diameter, wherein the inner second diameter is less than the inner first diameter; and a tip portion comprising a first angled portion, a second angled portion that is a different angle relative to the first angled portion, and an orifice; and introducing a pressurized fluid through the hollow blow needle to puncture the wall and inflate the parison against the walls of the cavity thus forming the container defined by the cavity, wherein the hollow blow needle directs the pressurized fluid away from the blow dome portion.

BRIEF DESCRIPTION OF SEVERAL VIEWS OF THE DRAWINGS

Results of the use of cleaning compositions within the scope of the present invention and of comparative compositions are illustrated in the accompanying drawings, which consist of the following Figures.

DETAILED DESCRIPTION OF THE INVENTION

The present invention is directed to an article and method for extrusion blow molding PET and, preferably extrusion grade PET (EPET), at high output rates that are characteristic of vertical wheel-type continuous extrusion blow molding machines such as, for example a Graham Wheel Standard, Super, or Mega (commercially available from Graham Engineering, York, Pa.). Suitable EPET for use in accordance with the present invention is, for example, POLYCLEAR® EBM PET 5505 available from Invista (Spartanburg, S.C.) and Eastman Copolymer PM32177 available from Eastman Chemical Company (Kingsport, Tenn.).

In particular, the present invention is directed to a hollow blow needle for introducing pressurized fluid (e.g., air) into an extruded EPET parison enclosed by a two mold halves defining a container such as, for example, an EPET container having a threaded finish and a handle portion. As used herein, the term "pressurized fluid" refers to a pressurized gas or mixtures of gases including, without limitation, air. Although the hollow blow needle of the present invention can be used to introduce a pressurized fluid into a parison made from any material, is particularly suited for use in connection with the manufacturing of EPET containers because, as explained in more detail below, the blow needle of the present invention is able to successfully blow an EPET container despite the poor flow properties of the EPET material at the higher mold temperatures required to process such material.

Figure 1:
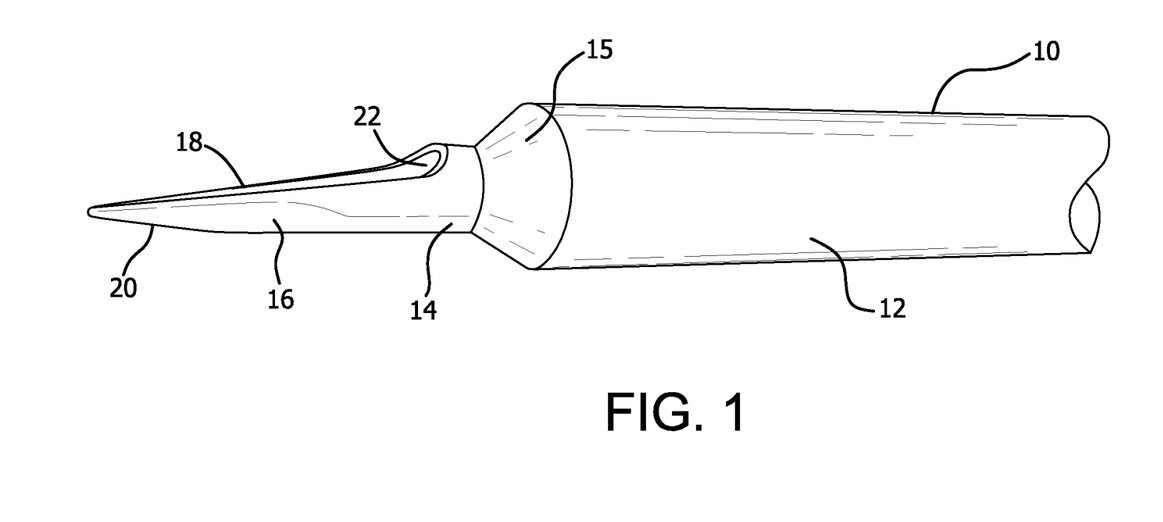
FIG. 1 is a close-up view of a hollow blow needle according to the present invention.

Referring now to FIG. 1, the hollow blow needle 10 of the present invention comprises body portion 12 having a first outer diameter (O.D.) of from about 0.426 inches to about 0.446 inches, preferably from about 0.431 inches to about 0.441 inches, and most preferably about 0.436 inches. Body portion 12 has a first inner diameter which differs from the first O.D. by the thickness of the wall. The first inner diameter preferably ranges from about 0.201 inches to about 0.376 inches, and preferably from about 0.201 inches to about 0.211 inches.

Hollow blow needle 10 further comprises a neck portion 14 having a second outer diameter, wherein the second outer diameter is less than the first outer diameter of the body portion 12 preferably by from about 44% to about 50% of the first O.D. of body portion 12, more preferably by from about 46% to about 50% of the first O.D. of body portion 12, and most preferably about 48% of the first O.D. of body portion 12. Because blow needle 10 is hollow, the second diameter corresponds to a second inner diameter based upon the thickness of the neck portion 14 between the second diameter and the second inner diameter. The second inner diameter preferably ranges from about 0.132 inches to about 0.158 inches, more preferably from about 0.141 inches to about 0.158 inches, and most preferably about 0.141 inches.

The thickness of neck portion 14 is preferably from about 0.030 inches to about 0.040 inches, and more preferably about 0.035 inches.

In between body portion 12 and tip portion 16 is tapered neck portion 15, which tapers the diameter of the hollow blow needle from the first diameter to the second diameter. The tapered neck portion 15 functions to stretch the parison wall rather than just pushing and deflecting it inward when contacting the parison wall. Stretching the parison wall allows for it to be thinned out enough to break open upon introduction of blow air. The narrower neck portion 14 allows for an increase in pressure due to reducing contact surface area.

The tapered neck portion 15 also directs blow air (i.e., pressurized fluid) away from the opposite side of the blow dome and the neck area of the finished bottle. Air directed against the dome can penetrate the other parison wall and leak air that would otherwise be needed for blowing the bottle. Air directed towards the neck would result in distortion of this area and possible bottle quality issues with closure application and sealing.

Still referring to FIG. 1, hollow blow needle 10 further comprises a double-angled (or double-tapered) tip portion 16 comprising a first angled portion 18, a second angled portion 20, wherein the second angled portion is a different angle relative to the first angled portion. Preferably, the angle of first angled portion 18 is from about 75.7° to about 91.7°, more preferably from about 78.7° to about 88.7°, and most preferably about 83.7°. Preferably, the angle of second angled portion 18 is from about 2° to about 18°, more preferably from about 5° to about 15°, and most preferably 10°. The double angled tip portion as defined herein functions to direct pressurized fluid downward into the parison to radially expand the parison against the cavity walls of the mold. Because of the rheological characteristics of the semi-molten EPET, in use, the hollow blow needle of the present invention first stretches the semi-molten EPET parison wall into the mold cavity without piercing the wall followed by delivery of a pressurized fluid to penetrate the parison wall to inflate the parison as will be described in more detail below. The temperature of the semi-molten EPET parison during this operation is typically from about 550° F. to about 600° F.

Figure 2:
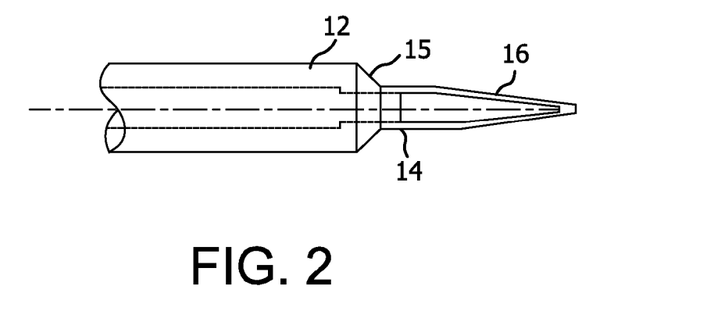
FIG. 2 is a close-up view of a portion of the hollow blow needle of FIG. 1.

Hollow blow needle 10 still further comprises an orifice 22 located on tip portion 16 through which pressurized fluid flows. The dimensions of orifice 22 are ultimately defined by tip portion 16, including first angled portion 18 and second angled portion 20 as can be seen in FIG. 2. Preferably, orifice 22 has an elongated shape.

Figure 3:
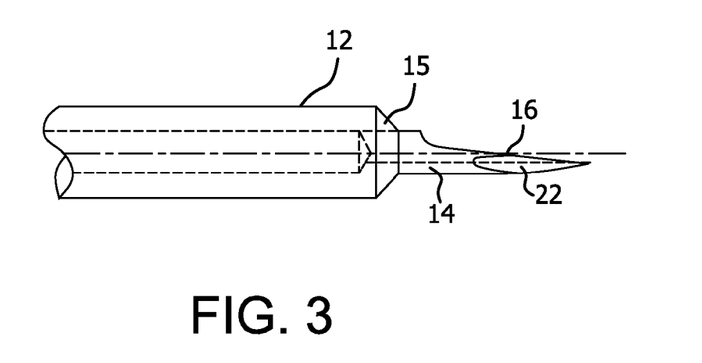
FIG. 3 is a sectional view of a portion of the hollow blow needle of FIG. 1 and FIG. 2 taken along the line A-A of FIG. 2.
Figure 4:
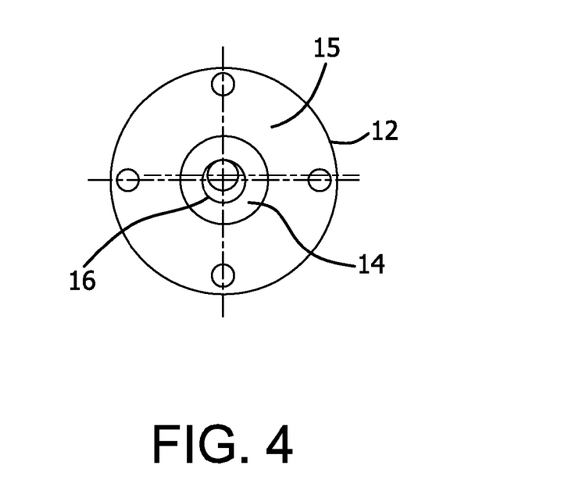
FIG. 4 is a view along the longitudinal axis of the blow needle of FIG. 2.

The diameter of orifice 22 is typically, the same as the inner diameter of the tip portion 16 (i.e., the second inner diameter). The ordinarily skilled artisan will appreciate that the diameter of the orifice is chosen to ensure proper blow air delivery with respect to the operating pressure and volume required to blow the container. FIG. 3 and FIG. 4 show additional views of tip portion 16 and its orifice 22. The function of orifice 22 so defined is to direct the flow of pressurized fluid downward as will be explained in more detail below.

Hollow blow needle 10 may be made from any durable material that renders the needle suitable for its intended use. Such materials include metals or metal alloys such as, for example, stainless steel. The preferred material is stainless steel. Moreover, the length of hollow blow needle 10 may be any suitable length to be determined by one of ordinary skill in the art to ensure proper location of a needle hole in a parison at the time of blowing a container.

Hollow blow needle 10 is typically delivered to a mold as a component of a blow assembly well known to the skilled artisan (not shown) which may be operated by, for example, a piston rod inserted through the mold at a blow needle insertion orifice. For example, a blow needle assembly is typically provided for each mold station and includes a cylinder means (not shown), and a piston means (not shown) that is slidably reciprocal within the cylinder means and carrying the hollow blow needle on its forward end whereby the needle is moved into and out of a portion of the molding cavity.

Figure 5:
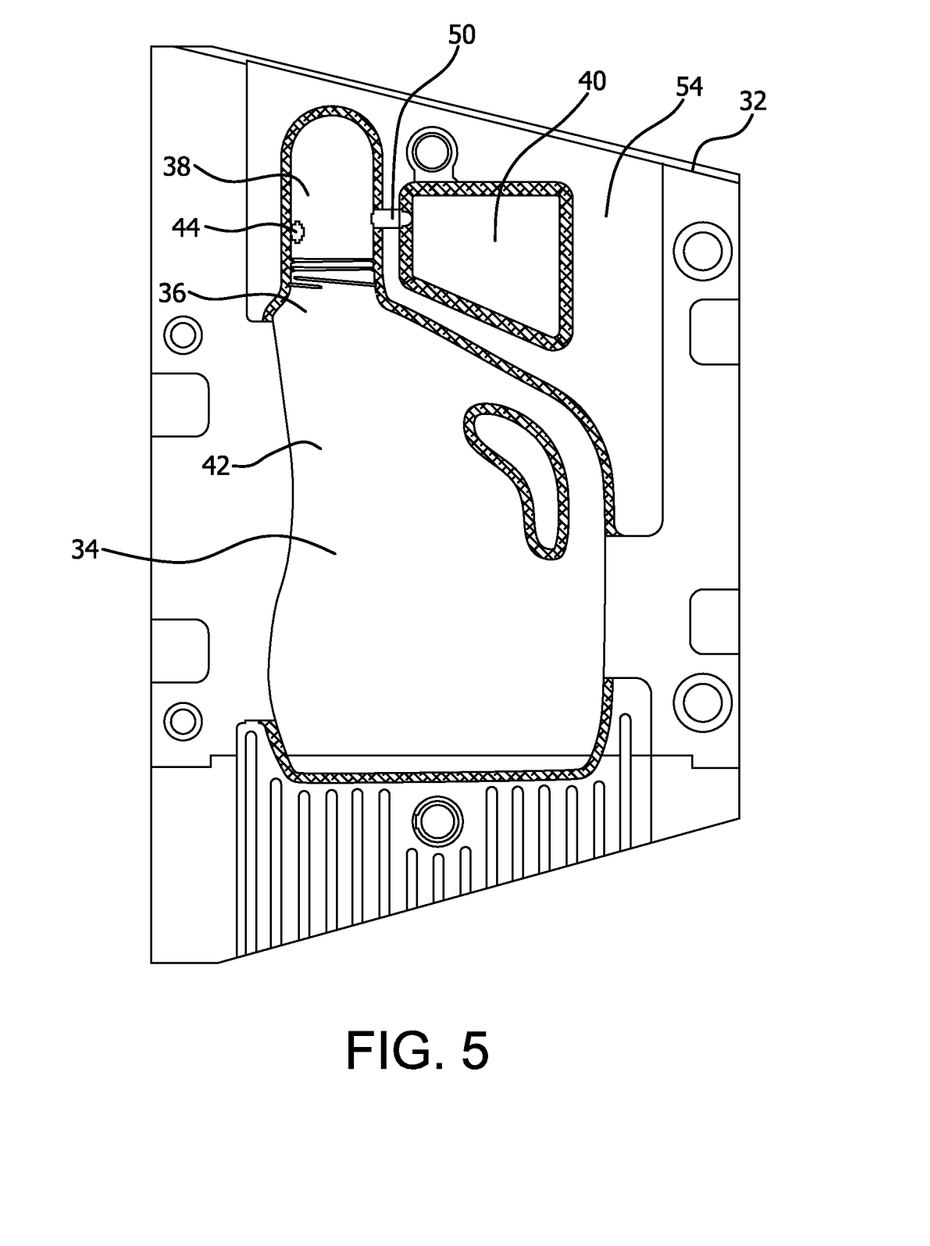
FIG. 5 is an illustration of a mold half in accordance with the present invention.

In another embodiment, the present invention provides a method of blow molding an article from a parison comprising EPET. The method comprises the step of positioning an extruded parison comprising EPET in a cavity defined by two mold halves, wherein the parison is defined by at least one wall comprising EPET, and wherein the cavity comprises walls that define the shape of a container comprising a handle portion and a blow dome portion. FIG. 5 illustrates an exemplary mold half that can, with its corresponding second half, be mounted upon conventional supporting and operating mechanisms for lateral movement between the separated mold half position (not shown) and the closed mold half position shown in the drawings. In FIG. 5 there is shown one mold halve 32 having an interior cavity portion such that when the mold halve is matedly closed with it's corresponding mold half (not shown) a cavity 34 is defined having a peripheral configuration of body portion 42 of the article being molded. Cavity 34 may include a generally semi-cylindrical neck defining portion 36, laterally offset from the axial center line, which is formed by cooperating semi-cylindrical portions of the mold halves. Situated above and laterally offset from the neck defining portions of the mold walls, mold half 32 may include a recess 38 that forms a semi-cylindrical passage that will ultimately define a blow dome on the article defined by the mold. Blow needle channel 44 is located on recess 38. Communicating with and located laterally beside recess 38 and axially above the body defining portions of the mold walls is hollow depression 40 of mold half 32 in the excess material portion 54 of mold half 32 that will become the shoulder flash on the article being molded. Hollow depression 40 and recess 38 are in communication with each other through passage 50.

Figure 6:
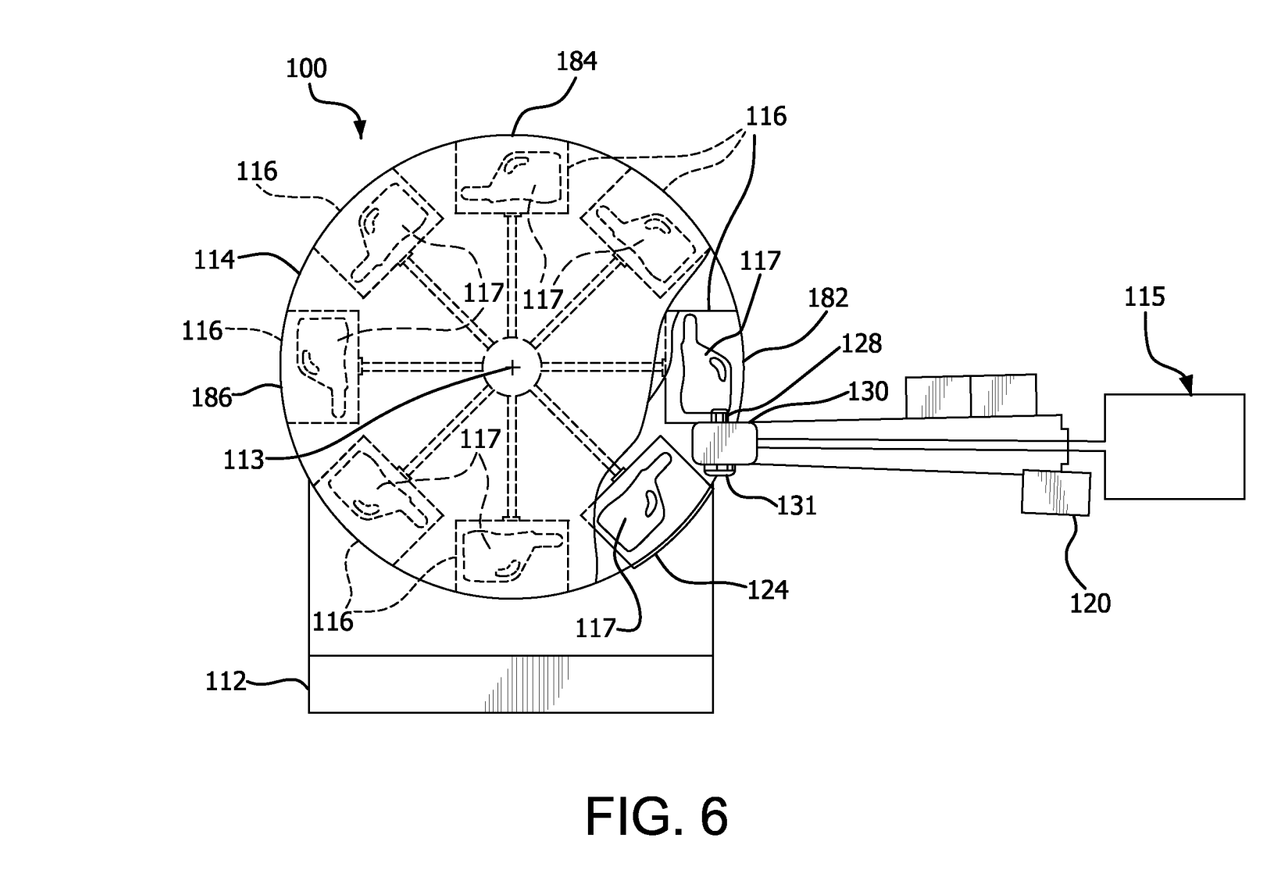
FIG. 6 is an illustration of a vertical rotary blow molding machine.

A brief description of the operation of a blow molding machine in connection with the present invention is illustrated with reference to FIG. 6, which depicts a vertical rotary blow molding machine 100. A typical blow molding machine represented by FIG. 6 is, for example, a Graham Wheel™ continuous vertical rotary blow molding machine (Graham Engineering, York, Pa.). The blow molding machine 100 rests on a base 112 and includes a rotatable wheel 114 and an extruder 115. The wheel 114 comprises a plurality of identical in-line molds 116, each mold 116 having an identical inner cavity 117 defining a container comprising a handle portion. Rotary blow molding machines typically have anywhere from 6 to 30 molds. The identical in-line molds 116 are mounted on wheel 114 preferably about the perimeter thereof, for rotation therewith about a rotational axis 113. The identical in-line molds 116 each preferably have a pair of mold halves (not shown) that split the respective inner cavities 117, and which open and close at various stations (described below) during rotation about the rotational axis 113 consistent with operation of a conventional wheel type extrusion blow molding apparatus.

The extruder 115 includes a die 130 located adjacent to the wheel 114 and defining a filling station 182 at which a series of hot plastic parisons are extruded from the die 130. The die 130 is positioned such that when the identical in-line molds 116 are continuously rotated to the filling station 182 by the wheel 114, the hot plastic parisons extruded from the die 130 may be accepted into the respective inner cavities 117 according to conventional wheel type blow moldings techniques.

In order to construct a proper bottle, a parison supplied by the die 130 will typically have a varying thickness profile along a length thereof to assure that upon the stretching experienced during blowing, the bottle will have the desired wall thickness at the various portions thereof. For example, it is often desirable to increase the thickness of a neck or bottom portion of a bottle relative to the remainder of the bottle to provide increased strength at those portions. Accordingly, the thickness of the parison for such a bottle may be, for example, relatively thicker at a top and bottom thereof corresponding to a neck and bottom portion of a bottle blown therefrom.

To facilitate the production of such a profile of a parison, a pin 128 of the die 130 controls the thickness of a wall of each parison extruded. The pin 128 is coupled to a hydraulic cylinder 131 by a drawbar (not shown) such that the hydraulic cylinder 131 may vary the position of the pin 128 during extrusion of a parison. As is known to one of ordinary skill in the art, the hydraulic cylinder 131 thus raises and lowers the pin 128 to vary the thickness of the parison as it is extruded. The controller 120 controls the hydraulic cylinder 131 and thus the positioning of the pin 128. The controller 120 has programmed therein, in a manner well-known to those skilled in the art, a preset pin control program or routine to control the vertical movement of the pin 128 during extrusion of each parison and manifests control of the pin 128 via the hydraulic cylinder 131 as is also known in the art. In this manner, the pin control program determines the thickness profile of the parison. The controller 120 also induces extrusion of the parison from the die 130 upon indication from the trigger mechanism 188 that a mold is in place and/or that a parison is required.

The method of the present invention also comprises the step of introducing the hollow blow needle as detailed above into the mold to contact a portion of the wall of the parison in the blow dome portion of the cavity to stretch the portion of the wall into the cavity. Still referring to FIG. 6, in normal operation, a parison is extruded from the die 130 and the mold halves of one of the identical in-line molds 116 close around the parison such that the parison is received by the inner cavity 117. After continuous rotation to blow station 184, the double-tapered tip portion 16 (not shown in FIG. 6) stretches the EPET parison wall into the mold cavity without piercing the parison wall under conventional operating conditions as detailed above. This is, in part, due to the rheological properties of the extrusion grade PET at operating temperatures of from about 550° F. to about 600° F. and, in part, due to the hollow blow needle of the present invention.

The method of the present invention also includes the step of introducing a pressurized fluid through the hollow blow needle to puncture the wall and inflate the parison against the walls of the cavity thus forming the container defined by the cavity, wherein the hollow blow needle directs the pressurized fluid away from the blow dome portion. Hollow blow needle 10 is attached to a source of pressurized fluid and is operable to be moved within a passage in a mold half. Hollow blow needle 10 may be reciprocally driven by a variety of mechanisms including hydraulic and pneumatic cylinders, motors and solenoids as are well-known in the art.

Figure 7:
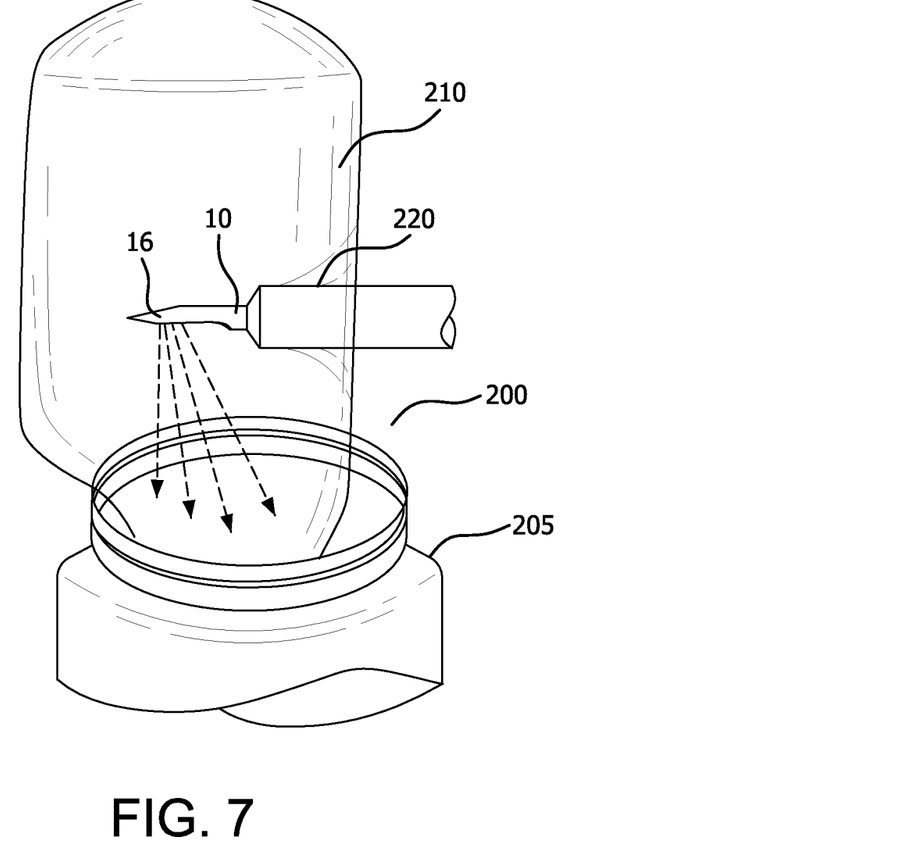
FIG. 7 is an illustration of a feature of the present invention.

Referring to FIG. 7, a portion of an article 200 blown in accordance with the present invention is shown. Article 200 comprises a threaded portion 205 and a blow dome 210 (prior to removal of the dome). For illustration, hollow blow needle 10 according to the present invention is shown. Stretched wall portion 225 is shown which is caused by the double-tapered tip portion 16 of hollow blow needle 10. In operation, once stretched wall portion is formed, the flow of pressurized fluid punctures the wall of the EPET parison. Although a portion of the pressurized fluid may be directed at a point opposite the tip portion 16, the directional arrows in FIG. 7 illustrate that the majority of the volume of pressurized fluid introduced into the EPET parison is directed downward and away from the blow dome 210. The pressurized fluid from hollow blow needle 10 radially expands the parison to conform to the shape and size of the inner cavity of the mold thereby forming a container.

In some embodiments of the present invention, the EPET parison is "pre-blown" in that it is partially inflated by means of a gas introduced therein from the extruder from which the parison is extruded. Typically, this pre-blown condition is obtained immediately prior to closure of the mold halves.

Referring back to FIG. 6, wheel 114 continues its rotation in a conventional manner. Once blown and at least partially cooled, the container is thereafter released by opening the mold halves at a release station 186. Continued operation of the wheel 114 can produce at least 75 bottles per minute. For example, a Mega 20 Graham Wheel producing 59 oz. bottles operates at 5 revolutions per minute to produce about 100 bottles per minute. Accordingly, the hollow blow needle of the present invention is suitable for use in an EBM process wherein the output rate is at least 75-100 BPM.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A hollow blow needle for introducing a pressurized fluid into an extruded parison enclosed by two mold halves, the needle comprising:
   a body portion having a first inner diameter;
   a neck portion having a second inner diameter, wherein the second inner diameter is less than the first inner diameter; and
   a double-tapered tip portion comprising a first angled portion, a second angled portion that is a different angle relative to the first angled portion, and an orifice.

2. The blow needle of claim 1 wherein the first inner diameter is from about 0.201 in. to about 0.376 in. and the second inner diameter is from about 0.132 in. to about 0.158 in.

3. The blow needle of claim 2 wherein the first inner diameter is from about 0.201 in. to about 0.211 in. and the second inner diameter is from about 0.141 in. to about 0.158 in.

4. The blow needle of claim 1 wherein the first angled portion is from about 75.7° to about 97.7° and the second angled portion is from about 2° to about 18°.

5. The blow needle of claim 4 wherein the first angled portion is about 78.7° to about 88.7° and the second angled portion is about 5° to about 15°.

6. A blow needle for introducing a pressurized fluid into an extruded parison enclosed by two mold halves, the needle comprising:
   a body portion having an inner diameter of from about 0.201 in. to about 0.211 in.;
   a neck portion having an inner diameter of from about 0.141 in. to about 0.158 in.; and
   a tip portion comprising a first angled portion having an angle of from about 78.7° to about 88.7°, a second angled portion having an angle of from about 5° to about 15°, and an orifice.

7. The blow needle of claim 6 wherein the inner diameter of the neck portion is 0.141 in.

8. The blow needle of claim 7 wherein the first angled portion is about 83.7°.

9. The blow needle of claim 8 wherein the second angled portion is about 10°.

10. The blow needle of claim 1 further comprising a first outer diameter; a second outer diameter that is less than the first outer diameter, and a tapered neck portion that tapers the diameter of the blow needle from the first outer diameter to the second outer diameter.

11. The blow needle of claim 10 wherein the first outer diameter is from about 0.426 inches to about 0.446 inches and the second outer diameter is less than the first outer diameter by from about 44% to about 50%.

12. The blow needle of claim 11 wherein the second outer diameter is less than the first outer diameter by from about 46% to about 50%.

13. The blow needle of claim 11 wherein the first outer diameter is from about 0.431 inches to about 0.441 inches.

14. The blow needle of claim 6 further comprising a first outer diameter; a second outer diameter that is less than the first outer diameter, and a tapered neck portion that tapers the diameter of the blow needle from the first outer diameter to the second outer diameter.

15. The blow needle of claim 14 wherein the first outer diameter is from about 0.426 inches to about 0.446 inches and the second outer diameter is less than the first outer diameter by from about 44% to about 50%.

16. The blow needle of claim 15 wherein the second outer diameter is less than the first outer diameter by from about 46% to about 50%.

17. The blow needle of claim 15 wherein the first outer diameter is from about 0.431 inches to about 0.441 inches.

18. The blow needle of claim 1 wherein the orifice has an elongated shape.

19. The blow needle of claim 6 wherein the orifice has an elongated shape.

* * * * *